United States Patent
Lu et al.

(10) Patent No.: US 9,426,445 B2
(45) Date of Patent: Aug. 23, 2016

(54) IMAGE PROCESSING APPARATUS AND IMAGE PROCESSING METHOD AND PROGRAM USING SUPER-RESOLUTION AND SHARPENING

(71) Applicant: NS SOLUTIONS CORPORATION, Chuo-ku, Tokyo (JP)

(72) Inventors: Jianming Lu, Tokyo (JP); Hiroshi Kaizuka, Tokyo (JP); Koutaro Ohtsubo, Tokyo (JP); Toshio Nagano, Tokyo (JP); Kazuki Iwahashi, Tokyo (JP)

(73) Assignee: NS SOLUTIONS CORPORATION, Tokyo (JP)

( * ) Notice: Subject to any disclaimer, the term of this patent is extended or adjusted under 35 U.S.C. 154(b) by 345 days.

(21) Appl. No.: 13/938,753

(22) Filed: Jul. 10, 2013

(65) Prior Publication Data

US 2014/0015926 A1    Jan. 16, 2014

(30) Foreign Application Priority Data

Jul. 10, 2012   (JP) .................................. 2012-155086

(51) Int. Cl.
    *H04N 13/00* (2006.01)

(52) U.S. Cl.
    CPC ....... *H04N 13/0033* (2013.01); *H04N 13/0018* (2013.01); *H04N 13/0029* (2013.01); *H04N 13/0048* (2013.01)

(58) Field of Classification Search
    CPC .......... H04N 13/0033; H04N 13/0018; H04N 13/0029; H04N 13/0048
    See application file for complete search history.

(56) References Cited

U.S. PATENT DOCUMENTS

| | | | |
|---|---|---|---|
| 7,400,766 B1 * | 7/2008 | Dominguez et al. | 382/173 |
| 2002/0041703 A1 * | 4/2002 | Fox | 382/154 |
| 2003/0193567 A1 * | 10/2003 | Hubel | 348/207.1 |
| 2005/0053307 A1 * | 3/2005 | Nose et al. | 382/275 |
| 2007/0268374 A1 * | 11/2007 | Robinson | 348/222.1 |
| 2007/0279513 A1 * | 12/2007 | Robinson | 348/335 |
| 2008/0178086 A1 * | 7/2008 | Zhang et al. | 715/719 |
| 2009/0059084 A1 * | 3/2009 | Okada et al. | 348/699 |
| 2009/0059096 A1 * | 3/2009 | Yamamoto et al. | 348/746 |
| 2009/0074323 A1 * | 3/2009 | Utsugi | 382/275 |
| 2009/0074328 A1 | 3/2009 | Matsumoto et al. | |
| 2009/0116592 A1 * | 5/2009 | Namba et al. | 375/344 |

(Continued)

FOREIGN PATENT DOCUMENTS

| | | |
|---|---|---|
| JP | 2009-070123 A | 4/2009 |
| JP | 2009-296080 A | 12/2009 |
| JP | 2012-029220 A | 2/2012 |

OTHER PUBLICATIONS

Japanese Office Action issued on Sep. 30, 2014; Application No. 2012-155086.

*Primary Examiner* — Jay Patel
*Assistant Examiner* — Joseph Suh
(74) *Attorney, Agent, or Firm* — Arent Fox LLP

(57) ABSTRACT

An image processing apparatus performs sharpening processing on each of a plurality of pieces of left-eye image data, and synthesizes them in a unit of predetermined group to generate left-eye intermediate image data (1). The image processing apparatus then performs sharpening processing on each of a plurality of pieces of left-eye intermediate image data (1) generated by the synthesizing processing and synthesizes them in a unit of predetermined group to generate left-eye intermediate image data (2).

9 Claims, 8 Drawing Sheets

(56) References Cited

U.S. PATENT DOCUMENTS

| | | | |
|---|---|---|---|
| 2009/0257683 A1* | 10/2009 | Cloud et al. | 382/299 |
| 2011/0007175 A1* | 1/2011 | Fujita et al. | 348/222.1 |
| 2011/0026811 A1* | 2/2011 | Kameyama | 382/159 |
| 2011/0096102 A1* | 4/2011 | Tsukagoshi | 345/690 |
| 2011/0122308 A1* | 5/2011 | Duparre | 348/340 |
| 2012/0026304 A1* | 2/2012 | Kawahara | 348/55 |
| 2012/0170667 A1* | 7/2012 | Girardeau et al. | 375/240.25 |
| 2012/0250993 A1* | 10/2012 | Iso et al. | 382/167 |
| 2012/0269267 A1* | 10/2012 | Choi et al. | 375/240.13 |
| 2013/0177242 A1* | 7/2013 | Adams et al. | 382/167 |

* cited by examiner

F I G. 8A 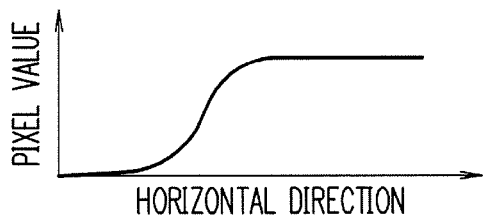
F I G. 8B 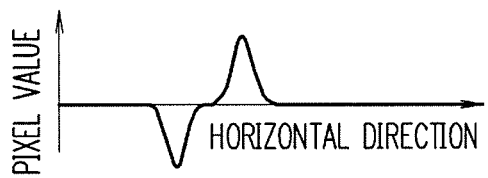
F I G. 8C 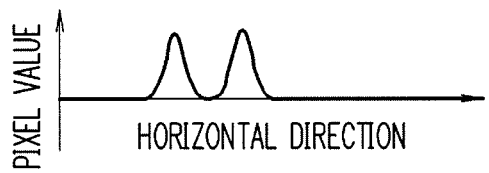
F I G. 8D 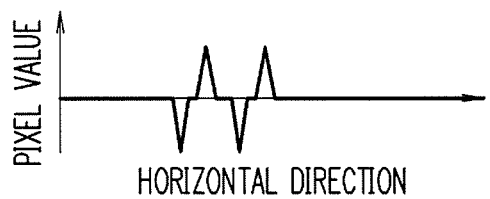
F I G. 8E 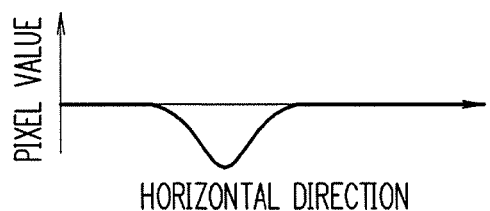
F I G. 8F 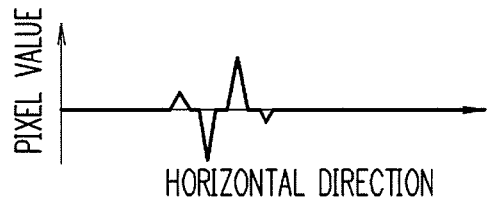
F I G. 8G 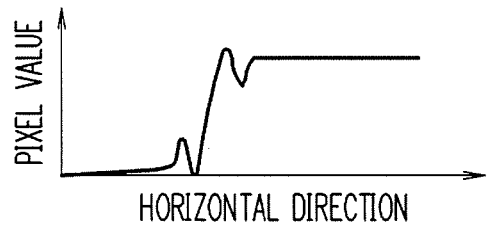

IMAGE PROCESSING APPARATUS AND IMAGE PROCESSING METHOD AND PROGRAM USING SUPER-RESOLUTION AND SHARPENING

CROSS-REFERENCE TO RELATED APPLICATION

This application is based upon and claims the benefit of priority of the prior Japanese Patent Application No. 2012-155086, filed on Jul. 10, 2012, the entire contents of which are incorporated herein by reference.

BACKGROUND OF THE INVENTION

1. Field of the Invention

The present invention relates to a super-resolution technology for image data.

2. Description of the Related Art

Conventionally, in media contents of digital broadcasting, DVD and so on, the resolution of image data is limited because of the limitation of the performance of camera and communication band width, but a so-called super-resolution technology is known that increases the resolution of image data whose resolution is limited.

Patent Document 1 discloses a technique of performing super-resolution processing for a frame at multiple steps by detecting movement between frames, moving positions of pixels in one of the frames to positions of pixels in the other frame, and overlapping them. Thus, the calculation amount is reduced as compared with that in the conventional method.

[Patent Document 1] Japanese Laid-open Patent Publication No. 2009-296080

SUMMARY OF THE INVENTION

However, the technique disclosed in Patent Document 1 vertically and horizontally enlarges two frames subjected to positional alignment and then overlaps them as they are. Accordingly, blur caused by the vertical and horizontal enlargement adversely affects the super-resolution processing and is a factor of hindrance to improve the quality of video.

Hence, an object of the present invention is to improve the quality of vide by eliminating the blur caused when compressed image data is restored in the super-resolution technology.

An image processing apparatus of the present invention includes: a first input unit that receives input of a plurality of pieces of first image data; a first image processing unit that performs sharpening processing on each of the plurality of pieces of first image data; a first synthesizing unit that synthesizes in a unit of predetermined group the plurality of pieces of first image data which have been subjected to the sharpening processing by the first image processing unit; a second image processing unit that performs sharpening processing on each of a plurality of pieces of second image data generated by synthesizing processing by the first synthesizing unit; and a second synthesizing unit that synthesizes in a unit of predetermined group the plurality of pieces of second image data which have been subjected to the sharpening processing by the second image processing unit.

BRIEF DESCRIPTION OF THE DRAWINGS

FIGS. 8A to 8G are charts illustrating changes in pixel value with respect to a horizontal direction of image data processed in the deformation processing unit.

DETAILED DESCRIPTION OF THE PREFERRED EMBODIMENTS

Hereinafter, a preferable embodiment to which the present invention is applied will be described in detail referring to the accompanying drawings.

Figure 1:
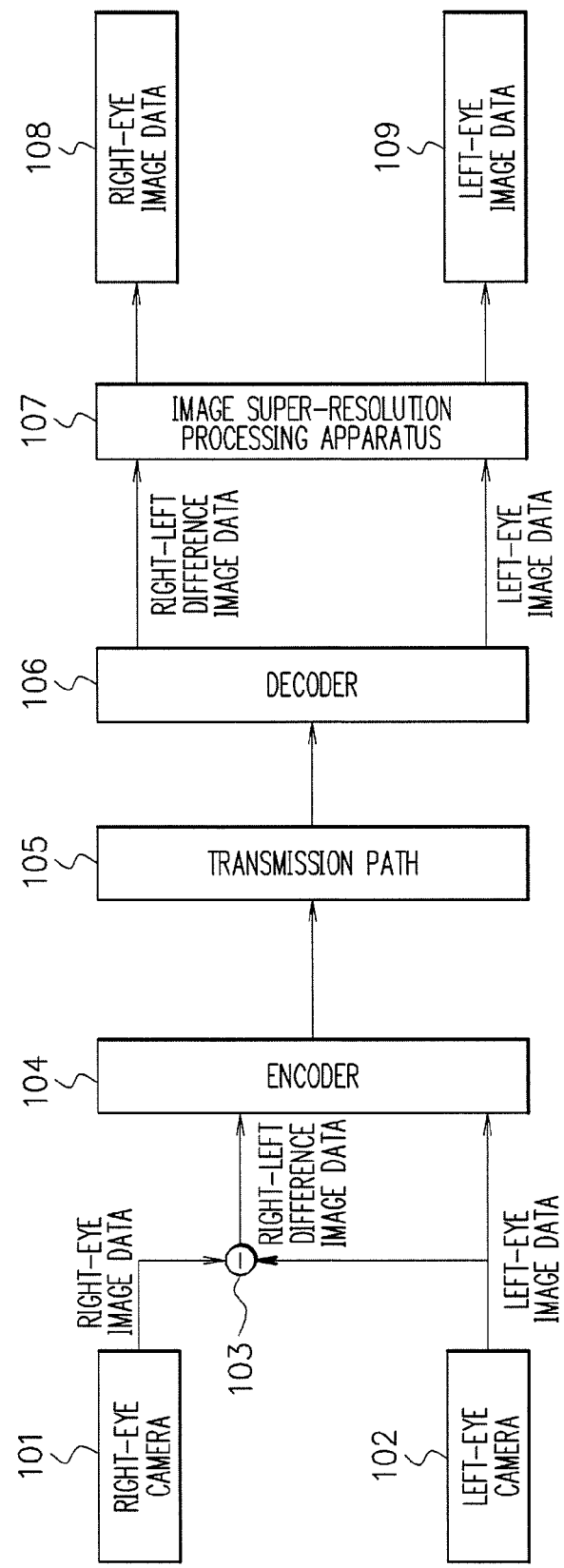
FIG. 1 is a diagram illustrating a configuration of a three-dimensional broadcasting system according to an embodiment of the present invention.

FIG. 1 is a diagram illustrating a configuration of a three-dimensional broadcasting system according to the embodiment of the present invention. In FIG. 1, a numeral 101 denotes a right-eye camera that captures right-eye image data and a numeral 102 denotes a left-eye camera that captures left-eye image data. In this embodiment, the right-eye camera 101 and the left-eye camera 102 angled with respect to each other by a parallax (an interval between both eyes of 6 to 7 cm) capture the right-eye image data and the left-eye image data so as to provide a stereoscopic view. A numeral 103 denotes a subtracter that generates right-left difference image data by taking a difference between the right-eye image data captured by the right-eye camera 101 and the left-eye image data captured by the left-eye camera 102. A numeral 104 is an encoder that receives input of the left-eye image data captured by the left-eye camera 102 and the right-left difference image data generated by the subtracter 103, encodes (compresses) the data by the MPEG-2 method or the like so that the left-eye image data and the right-left difference image data fall within an existing broadcasting frame size, and then outputs the encoded data to a transmission path 105. It is assumed here that 60 pieces of frame image data per second are generated. As described above, since the left-eye image data and the right-left difference image data can be contained in the existing broadcasting frame and transmitted in one stream in this embodiment, viewers do not need to change existing tuner devices and the like and broadcasting organizations do not need to change existing broadcast/relay facilities.

A numeral 106 denotes a decoder that, when receiving input of the encoded frame image data from the transmission path 105, decodes the frame image data to acquire the left-eye image data and the right-left difference image data. A numeral 107 denotes an image super-resolution processing apparatus that performs super-resolution processing using the left-eye image data and the right-left difference image data to acquire image-quality-improved right-eye image data 108 and left-eye image data 109. The right-eye image data 108 and left-eye image data 109 thus regenerated are alternately displayed at high speed on a not-illustrated screen. Further, an infrared signal in synchronization with the alternate display is sent to special 3D glasses to alternately open and close right and left liquid crystal shutters of the special 3D glasses, thereby enabling a right eye to view the right-eye image data and a left eye to view the left-eye image data. The viewer can feel stereoscopic effect by combining the right-eye image data viewed by the right eye and the left-eye image data viewed by the left eye in the brain.

Figure 2:
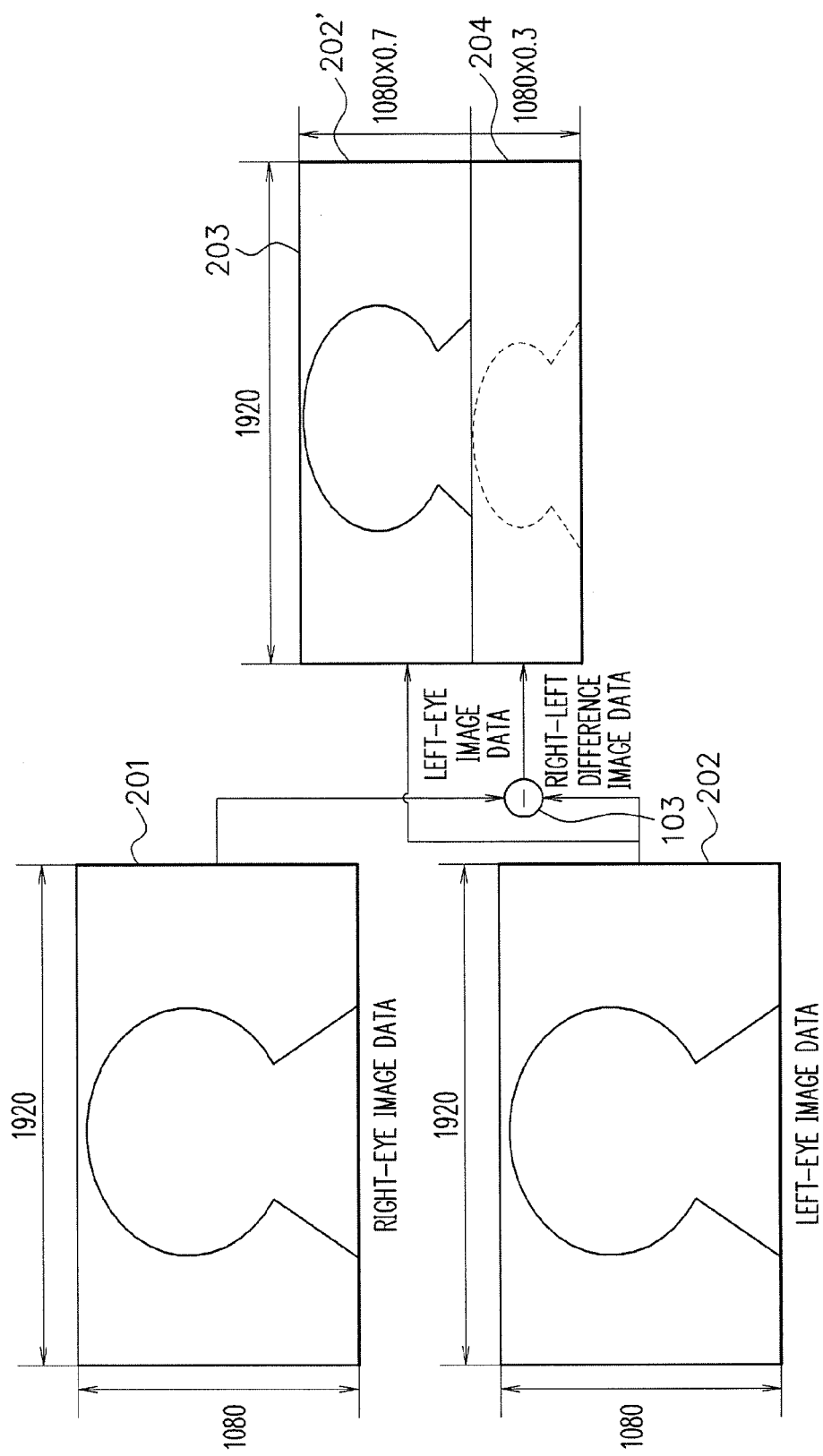
FIG. 2 is a view for explaining processing of generating frame image data by an encoder.

FIG. 2 is a view for explaining processing of generating the frame image data by the encoder 104. In FIG. 2, a numeral 201 denotes the right-eye image data captured by the right-eye camera 101. A numeral 202 denotes the left-eye image data captured by the left-eye camera 102. A numeral 203 denotes the frame image data generated by the encoder 104, and contains left-eye image data 202' obtained by compressing the left-eye image data 202 and right-left difference image data 204 obtained by compressing the difference between the right-eye image data 201 and the left-eye image data 202.

The encoder 104 generates the left-eye image data 202' by compressing the left-eye image data 202 captured by the left-eye camera 102 at a compression ratio of 70%, and generates the right-left difference image data 204 by taking the difference between the right-eye image data 201 and the left-eye image data 202 and compressing the difference at a compression ratio of 30%. Since this embodiment is intended for the three-dimensional broadcasting of high vision image, the sizes of both of the right-eye image data and the left-eye image data captured by the right-eye camera 101 and the left-eye camera 102 are 1920×1080 pixels. Accordingly, the size of the compressed left-eye image data 202' becomes 1920×1080×0.7 pixels, and the size of the compressed right-left difference image data 204 becomes 1920×1080×0.3 pixels. Note that the compression ratios in the encoder 104 are not limited to those ratios, but any compression ratios may be employed as long as the compression ratio of the left-eye image data 202 is higher than the compression ratio of the right-left difference image data 204. Further, the frame image data may be generated not using the left-eye image data 202 and the right-left difference image data 204 but using the right-eye image data 201 and the right-left difference image data 204. In this case, it is only necessary to set the compression ratio of the right-eye image data 201 higher than the compression ratio of the right-left difference image data 204.

The encoder 104 generates the frame image data 203 in which the compressed left-eye image data 202' and the compressed right-left difference image data 204 are arranged one on the other. Note that the arrangement of the compressed left-eye image data 202' and the compressed right-left difference image data 204 is not limited to the one in which they are arranged at upper and lower positions in the frame image data 203 but may be the one in which they are arranged at any positions, for example, at right and left positions in the frame image data 203. The frame image data 203 thus generated is inputted into the decoder 106 via the transmission path 105. When receiving input of the frame image data 203, the decoder 106 acquires the compressed left-eye image data 202' and the compressed right-left difference image data 204 from the frame image data 203. The image super-resolution processing apparatus 107 performs enlargement processing, sharpening processing and so on stepwise on the compressed left-eye image data 202' and the compressed right-left difference image data 204 to thereby regenerate the right-eye image data and the left-eye image data with image quality improved.

Figure 3:
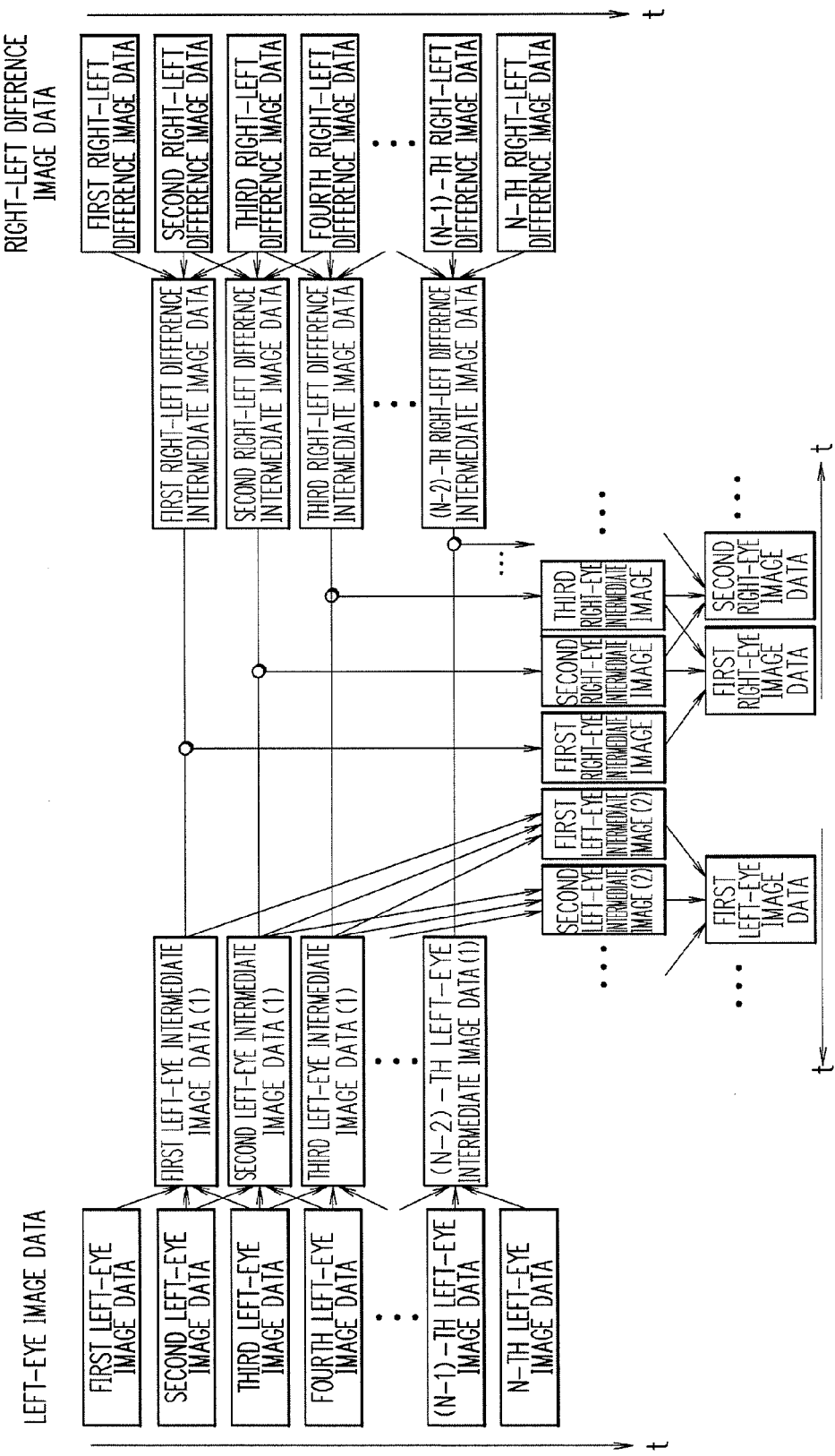
FIG. 3 is a diagram for explaining processing by an image super-resolution processing apparatus.

FIG. 3 is a diagram for explaining processing by the image super-resolution processing apparatus 107. The decoder 106 receives input of frame image data from the transmission path 105, for example, at 60 f/s, acquires left-eye image data and right-left difference image data from each piece of frame image data, and outputs them to the image super-resolution processing apparatus 107. FIG. 3 illustrates an appearance in which first left-eye image data, second left-eye image data, third left-eye image data, fourth left-eye image data, . . . , (N−1)-th left-eye image data, and N-th left-eye image data are sequentially inputted into the image super-resolution processing apparatus 107 from the decoder 106, and an appearance in which first right-left difference image data, second right-left difference image data, third right-left difference image data, fourth right-left difference image data, . . . , (N−1)-th right-left difference image data, and N-th right-left difference image data are sequentially inputted into the image super-resolution processing apparatus 107 from the decoder 106.

As illustrated in FIG. 3, the image super-resolution processing apparatus 107 generates, from three successive pieces of left-eye image data, one piece of left-eye intermediate image data (1) made higher in quality than the pieces of left-eye image data by using the super-resolution technology. Then, the image super-resolution processing apparatus 107 generates, from three successive pieces of left-eye intermediate image data (1), one piece of left-eye intermediate image data (2) made higher in quality than the pieces of left-eye intermediate image data (1) by using the super-resolution technology. Then, the image super-resolution processing apparatus 107 generates, from three successive pieces of left-eye intermediate image data (2), one piece of left-eye image data made higher in quality than the pieces of left-eye intermediate image data (2) by using the super-resolution technology. Note that three successive pieces of image data are used here in order to perform the super-resolution technology, but the number of successive pieces of image data is not limited to three. Further, pieces of intermediate image data are generated in two steps, but the number of steps is not limited to two. This also applies to the following description. Furthermore, it is only necessary to use an ordinary super-resolution technology, and its detailed description will be omitted.

Further, the image super-resolution processing apparatus 107 generates, from three successive pieces of right-left difference image data, one piece of right-left difference intermediate image data made higher in quality than the pieces of right-left difference image data by using the super-resolution technology. Then, the image super-resolution processing apparatus 107 generates, from the piece of right-left difference intermediate image data and the piece of left-eye intermediate image data, one piece of right-eye intermediate image data by using the super-resolution technology. Then, the image super-resolution processing apparatus 107 generates, from three successive pieces of right-eye intermediate image data, one piece of right-eye image data made higher in quality than the pieces of right-eye intermediate image data by using the super-resolution technology.

Figure 4:
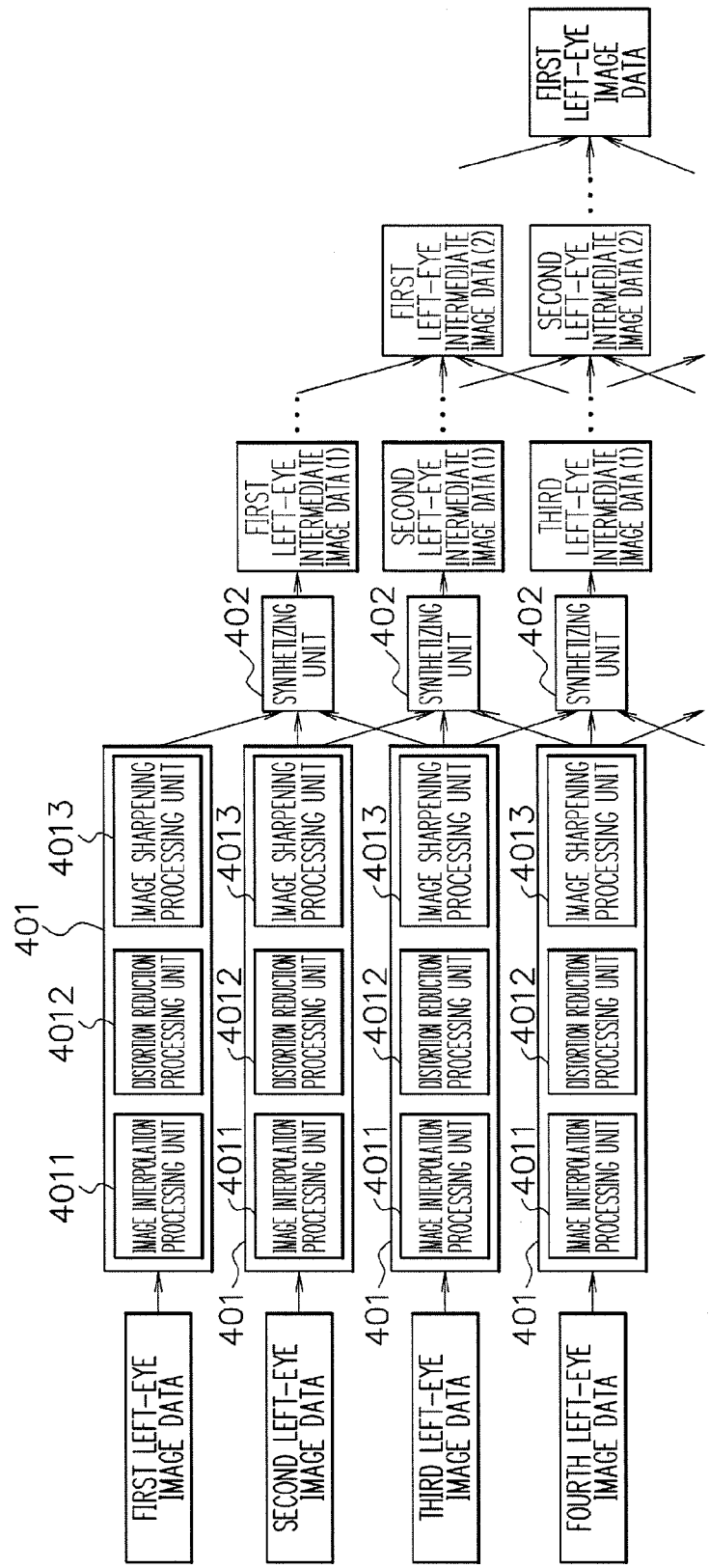
FIG. 4 is a diagram illustrating a part of the configuration of the image super-resolution processing apparatus.

FIG. 4 is a diagram illustrating a part of the configuration of the image super-resolution processing apparatus 107. More specifically, FIG. 4 illustrates only a configuration of the image super-resolution processing apparatus 107, which relates to processing of finally generating first left-eye image data from the first to fourth left-eye image data.

As illustrated in FIG. 4, the image super-resolution processing apparatus 107 includes image processing units 401 corresponding to the first to fourth left-eye image data respectively. Further, each of the image processing units 401 includes an image interpolation processing unit 4011, a distortion reduction processing unit 4012, and an image sharpening processing unit 4013.

The image interpolation processing unit 4011 performs image interpolation processing on the left-eye image data by the bi-cubic method or the like. More specifically, the image processing unit 401 enlarges to a certain size the left-eye image data compressed, for example, at a compression ratio of 70%, and the image interpolation processing unit 4011 performs pixel interpolation processing for the enlarged left-eye image data.

The distortion reduction processing unit 4012 generates absolute deviation image data by applying a median filter or the like to the left-eye image data outputted from the image interpolation processing unit 4011. Then, the distortion reduction processing unit 4012 extracts an edge component by performing morphology processing or the like on the absolute deviation image data, and subtracts the edge component from the absolute deviation image data to extract a noise component. Then, the distortion reduction processing unit 4012 provides a pixel corresponding to the noise component with a median value of pixels around the pixel to thereby perform distortion reduction processing on the left-eye image data.

The image sharpening processing unit 4013 performs sharpening processing or the like on the left-eye image data outputted from the distortion reduction processing unit 4012 to thereby emphasize the edge of the left-eye image data. The left-eye image data subjected to the sharpening processing is outputted to a synthesizing unit 402. Note that the detailed configuration of the image sharpening processing unit 4013 will be described later.

The synthesizing unit 402 receives input of three successive pieces of left-eye image data from the image processing units 401 corresponding to the respective pieces of the left-eye image data and synthesizes them. Here, in order to align a second piece of left-eye image data among the three successive pieces of left-eye image data with the object, the synthesizing unit 402 shifts pixel values of preceding and subsequent pieces of left-eye image data (a first piece of left-eye image data, a third piece of left-eye image data). The synthesizing unit 402 then generates left-eye intermediate image data (1) made by averaging pixel values, among corresponding pixels, of the second piece of left-eye image data, the first piece of left-eye image data whose pixel values have been shifted, and the third piece of left-eye image data whose pixel values have been shifted. As described above, by performing restoration, noise removal and sharpening on the compressed left-eye image data inputted via the transmission path 105, image-quality-improved left-eye intermediate image data can be obtained.

Also at stages subsequent to the left-eye intermediate image data (1) in FIG. 4, an image processing unit 401 (not illustrated) and a synthesizing unit 402 (not illustrated) are provided to generate a piece of left-eye intermediate image data (2) from three successive pieces of left-eye intermediate image data (1) in the same manner. Furthermore, also at stages subsequent to the left-eye intermediate image data (2) in FIG. 4, an image processing unit 401 (not illustrated) and a synthesizing unit 402 (not illustrated) are provided to generate a piece of left-eye image data from three successive pieces of left-eye intermediate image data (2) in the same manner. The image super-resolution processing apparatus 107 enlarges the size of data in the image processing units stepwise to the original size, from the compressed left-eye image data→the left-eye intermediate image data (1)→the left-eye intermediate image data (2)→the restored left-eye image data (for example, 70%→80%→90%→100%).

Figure 5:
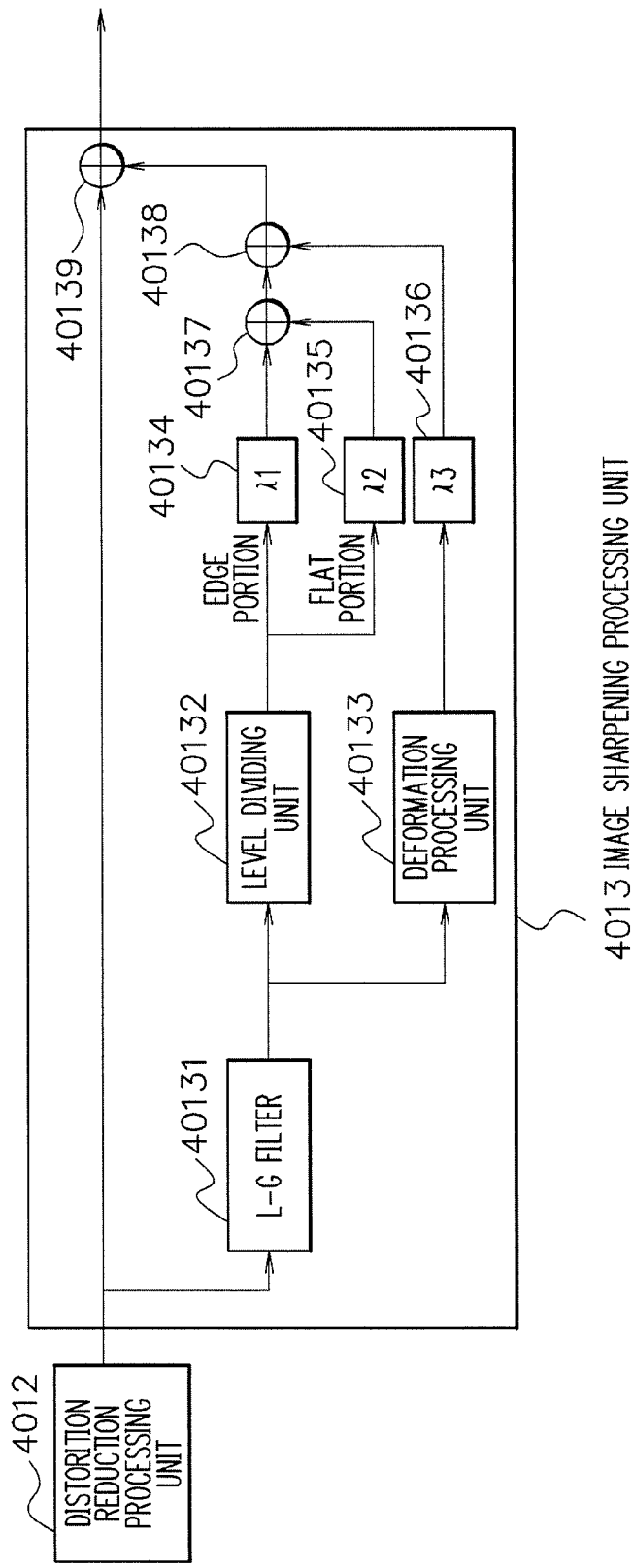
FIG. 5 is a diagram illustrating a detailed configuration of an image sharpening processing unit.

FIG. 5 is a diagram illustrating a detailed configuration of one example of the image sharpening processing unit 4013 in FIG. 4. As illustrated in FIG. 5, the image data subjected to the distortion reduction processing in the distortion reduction processing unit 4012 is inputted into the image sharpening processing unit 4013. The image data inputted from the distortion reduction processing unit 4012 is outputted to each of an adder 40139 and a Laplacian-Gaussian (L-G) filter 40131. The L-G filter 40131 generates edge image data from the inputted image data. A level dividing unit 40132 compares pixel values of the edge image data outputted from the L-G filter 40131 with a predetermined threshold value and thereby divides pixels of the edge image data into a plurality of levels to classify the edge image data to two levels, for example, an edge portion and a flat portion according to the level. A deformation processing unit 40133 deforms the edge image data outputted from the L-G filter 40131 by a predetermined method. In the level division, it is only necessary to take out at least one edge, and two levels or three levels may be arbitrarily set depending on the sharpness of the edge. Hereinafter, the case of using the edge portion and the flat portion as two levels of classification will be described.

A weighting unit ($\lambda 1$) 40134 performs weighting ($\lambda 1$) on the edge portion outputted from the level dividing unit 40132. A weighting unit ($\lambda 2$) 40135 performs weighting ($\lambda 2$) on the flat portion outputted from the level dividing unit 40132. A weighting unit ($\lambda 3$) 40136 performs weighting ($\lambda 3$) on the edge image data outputted from the deformation processing unit 40133 (described later in detail).

An adder 40137 adds the edge portion subjected to the weighting ($\lambda 1$) and the flat portion subjected to the weighting ($\lambda 2$), and outputs a resultant. An adder 40138 adds the output of the adder 40137 and the edge image data deformed by the deformation processing unit 40133 and subjected to the weighting ($\lambda 3$), and outputs a resultant. An adder 40139 adds the output of the adder 40138 and the image data subjected to the distortion reduction processing in the distortion reduction processing unit 4012, and output a resultant. As described above, the image sharpening processing unit 4013 has a configuration to perform weighting on pieces of the edge image data classified into the plurality of levels and then add them into the original image data, and thereby can emphasize the edge portion of the image data inputted from the distortion reduction processing unit 4012 to sharpen the image data.

Figure 7:
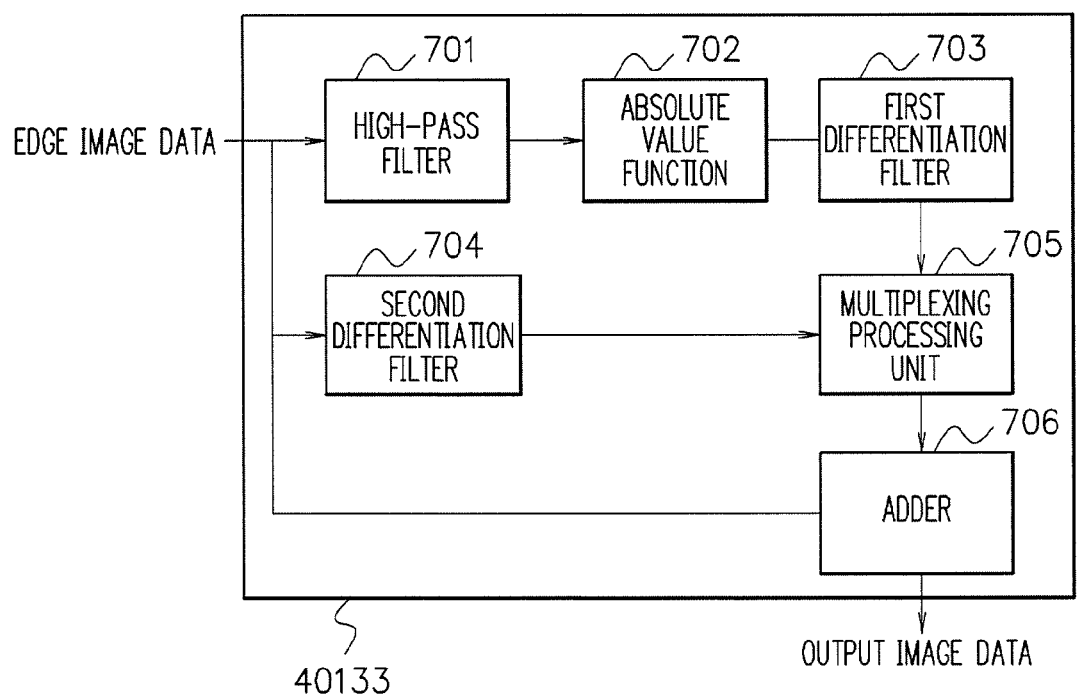
FIG. 7 is a diagram illustrating a detailed configuration of a deformation processing unit.

FIG. 7 is a diagram illustrating a detailed configuration of the deformation processing unit 40133 in FIG. 5. As illustrated in FIG. 7, the edge image data outputted from the L-G filter 40131 is inputted into a high-pass filter 701, a second differentiation filter 704 and an adder 706. FIG. 8A illustrates a change in pixel value with respect to a horizontal direction of the edge image data inputted into the high-pass filter 701, the second differentiation filter 704 and the adder 706. The high-pass filter 701 extracts a high-frequency component of the edge image data. FIG. 8B illustrates a change in pixel value with respect to a horizontal direction of the edge image data of the high-frequency component extracted by the high-pass filter 701. An absolute value function 702 performs absolute value processing on the high-frequency component extracted by the high-pass filter 701. FIG. 8C illustrates a change in pixel value with respect to a horizontal direction of the edge image data of the high-frequency component subjected to the absolute value processing. A first differentiation filter 703 extracts a portion with a large concentration change (difference) of pixel value, of the high-frequency component subjected to the absolute value processing. FIG. 8D illustrates a change in pixel value with respect to a horizontal direction of the edge image data of the portion with a large concentration change (difference) of pixel value extracted by the first differentiation filter 703. The second differentiation filter 704 extracts a portion with a large concentration change (difference) of pixel value, of the edge image data. FIG. 8E illustrates a change in pixel value with respect to a horizontal direction of the edge image data of the portion with a large concentration change (difference) of pixel value extracted by the second differentiation filter 704. A multiplexing processing unit 705 multiplies the output of the first differentiation filter 703 and the output of the second differentiation filter 704, and outputs a resultant. FIG. 8F illustrates a change in pixel value with respect to a horizontal direction of the edge image data of the multiplication result of the output of the first differentiation filter 703 and the output of the second differentiation filter 704. The adder 706 adds the edge image data and the output of the multiplexing processing unit 705, and outputs a resultant. FIG. 8G illustrates a change in pixel value with respect to a horizontal direction of the edge image data of the addition result of the edge image data and the output of the multiplexing processing unit 705. The addition result of the edge image data and the output of the multiplexing processing unit 705 illustrated in FIG. 8G is the output of the deformation processing unit 40133. The deformation processing described here is merely one example, and another arbitrary method may be employed.

Figure 6:
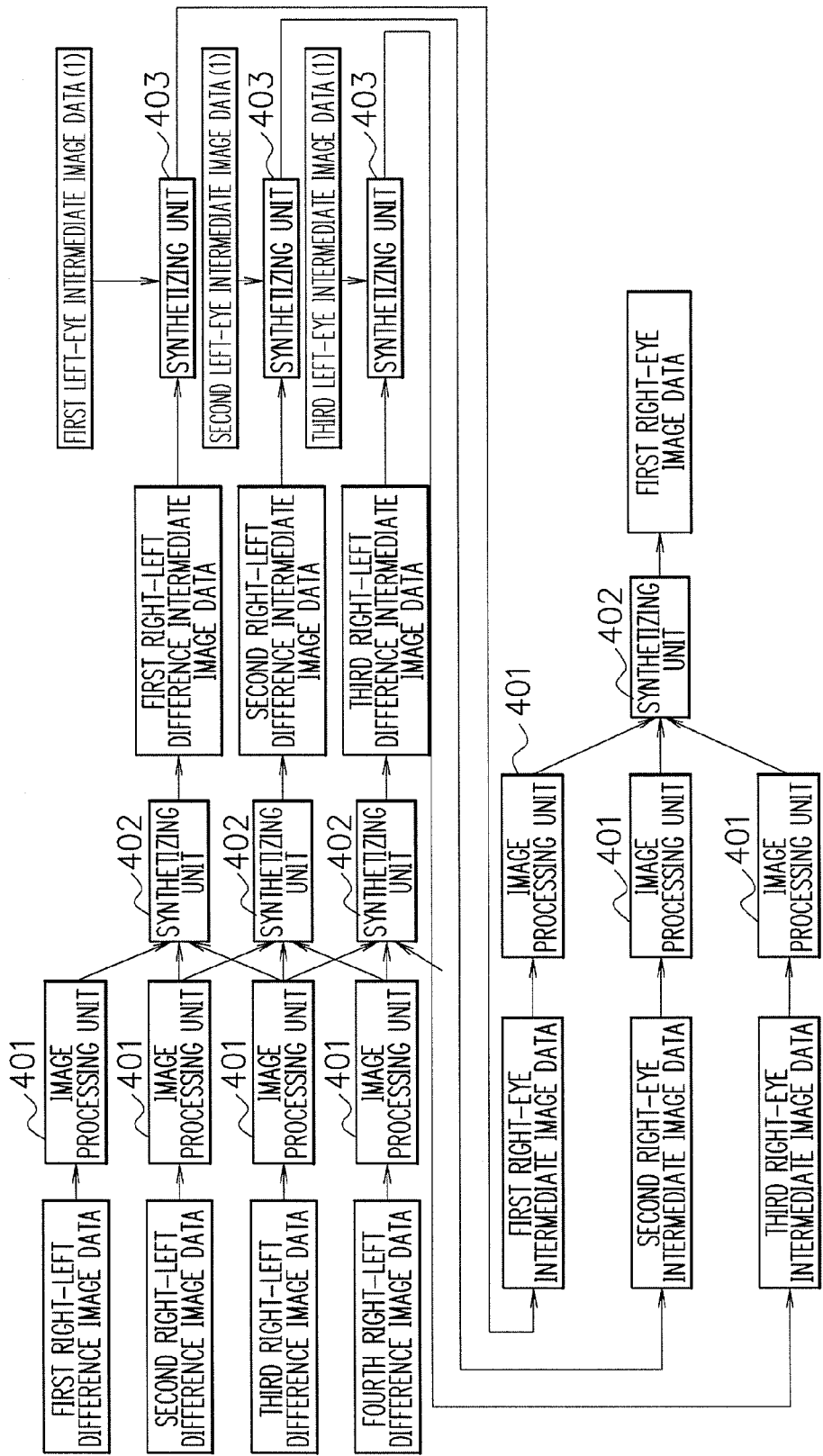
FIG. 6 is a diagram illustrating a part of the configuration of the image super-resolution processing apparatus.

FIG. 6 is a diagram illustrating a part of the configuration of the image super-resolution processing apparatus 107. More specifically, FIG. 6 illustrates only a configuration of the image super-resolution processing apparatus 107, which relates to processing of finally generating first right-eye image data from the first to fourth right-left difference image data and the first to third left-eye intermediate image data (1).

As illustrated in FIG. 6, the image super-resolution processing apparatus 107 includes image processing units 401 corresponding to the first to fourth right-left difference image data respectively. Each of the image processing units 401 includes, as with the image processing unit 401 illustrated in FIG. 4, an image interpolation processing unit 4011, a distortion reduction processing unit 4012, and an image sharpening processing unit 4013.

Further, a synthesizing unit 402 illustrated in FIG. 6 has the same function as that of the synthesizing unit 402 illustrated in FIG. 4. More specifically, the synthesizing unit 402 illustrated in FIG. 6 receives input of three successive pieces of right-left difference image data from the image processing units 401 corresponding to the respective pieces of right-left difference image data and synthesizes them. Here, in order to align a second piece of right-left difference image data among the three successive pieces of right-left difference image data with the object, the synthesizing unit 402 shifts pixel values of preceding and subsequent pieces of right-left difference image data (a first piece of right-left difference image data, a third piece of right-left difference image data). The synthesizing unit 402 then generates right-left difference intermediate image data made by averaging pixel values, among corresponding pixels, of the second piece of right-left difference image data, the first piece of right-left difference image data whose pixel values have been shifted, and the third piece of right-left difference image data whose pixel values have been shifted.

Further, a synthesizing unit 403 synthesizes the right-left difference intermediate image data and the left-eye intermediate image data (1) to generate right-eye intermediate image data.

Further, the image super-resolution processing apparatus 107 includes image processing units 401, similar to those in FIG. 4, corresponding to respective pieces of right-eye intermediate image data. A synthesizing unit 402 receives input of three successive pieces of right-eye intermediate image data from the image processing units 401 corresponding to the respective pieces of right-eye intermediate image data and synthesizes them. Here, in order to align a second piece of right-eye intermediate image data among the three successive pieces of right-eye intermediate image data with the object, the synthesizing unit 402 shifts pixel values of preceding and subsequent pieces of right-eye intermediate image data (a first piece of right-eye intermediate image data, a third piece of right-eye intermediate image data). The synthesizing unit 402 then generates right-eye image data made by averaging the pixel values, among corresponding pixels, of the second piece of right-eye intermediate image data, the first piece of right-eye intermediate image data whose pixel values have been shifted, and the third piece of right-eye intermediate image data whose pixel values have been shifted.

When the left-eye image data and the right-eye image data are generated by the above-described processing, they are alternately displayed at high speed on the three-dimensional television. This enables a viewer wearing special 3D glasses to view a video with stereoscopic effect.

In this embodiment, since noise removal and edge emphasis are performed every time when the compressed image data (the left-eye image data, the right-left difference image data) inputted via the transmission path 105 is enlarged (restored) stepwise, blur caused when the compressed image data is enlarged (restored) can be eliminated. Further, in this embodiment, since the final right-eye image data and left-eye image data are generated by performing noise removal and sharpening at multiple steps, the video can be improved in quality.

Further, in this embodiment, the compression ratio of the left-eye image data (for example, 70%) is made higher than the compression ratio of the right-left difference image data (for example, 30%) so as not to decrease the data amount of the left-eye image data to be transmitted as illustrated in FIG. 2. More specifically, in this embodiment, the compressed left-eye image data with a relatively large data amount can be used when the left-eye image data and the right-eye image data are regenerated. In contrast, in the conventional side-by-side method, the left-eye image data compressed at a compression ratio of 50% and the right-eye image data compressed at a compression ratio of 50% are transmitted arranged side by side in one frame, and they are regenerated at the receiving side by enlarging them to twice the respective sizes. In other words, in the side-by-side method, the image data compressed at a compression ratio of 50% is used when regenerating the left-eye image data and the right-eye image data. As described above, in this embodiment, the data amount of the original image data to be used when regenerating the image data is larger than that in the side-by-side method, and the super-resolution processing is performed on the image data to improve the quality of the image data to be regenerated.

Note that the three-dimensional broadcasting system has been described in the above embodiment, but the application rage of the present invention is not limited to that. Namely, the present invention is also applicable to super-resolution processing on moving image data captured by a monitoring camera irrespective of three dimensions, and to super-resolution processing using a plurality of similar pieces of still image data. In these cases, processing is performed on pieces of frame image data of the moving image data and the plurality of similar pieces of still image data using the configuration illustrated in FIG. 4.

Further, the present invention is embodied also by executing the following processing. That is the processing in which software (program) embodying the above-described functions of the embodiment is supplied to a system or an apparatus via a network or various kinds of storage media, and a computer (or CPU, MPU or the like) of the system or the apparatus reads and executes the program.

According to the present invention, the quality of video can be improved by eliminating the blur caused when compressed image data is restored.

It should be noted that the above embodiments merely illustrate concrete examples of implementing the present invention, and the technical scope of the present invention is not to be construed in a restrictive manner by these embodiments. That is, the present invention may be implemented in various forms without departing from the technical spirit or main features thereof.

What is claimed is:

1. An image processing apparatus comprising:
   a memory configured to store instructions; and
   a processor communicatively coupled to the memory, the processor configured to execute the instructions to:
   receive, at a first input unit, input of a plurality of pieces of first image data of successive plural frames;
   perform, at a first image processing unit, sharpening processing on each of the plurality of pieces of image data of the successive plural frames;
   perform, at a first synthesizing unit, super-resolution processing in a unit of predetermined group to the plurality of pieces of image data which have been subjected to the sharpening processing by the first image processing unit, to generates one intermediate image data;
   perform sharpening processing on each of a plurality of pieces of intermediate image data generated by synthesizing processing super-resolution processing by the first synthesizing unit; and
   perform, at a second synthesizing unit, super-resolution processing in a unit of predetermined group to the plurality of pieces of intermediate image data which have been subjected to the sharpening processing by the second image processing unit, and generate the one intermediate image data.

2. The image processing apparatus according to claim 1, wherein the processor is further configured to execute the instructions to:
   interpolate a pixel of image data inputted to an image interpolation processing unit;
   perform distortion reduction processing on the image data which has been interpolated with the pixel by the image interpolation processing unit; and
   perform sharpening processing on the image data which has been subjected to the distortion reduction processing.

3. The image processing apparatus according to claim 2, wherein the processor is further configured to execute the instructions to:
   generate edge image data from the image data;
   classify the edge image data to an edge portion and a flat portion by comparing a pixel value of the edge image data with a predetermined threshold value;
   perform first weighting on the edge portion;
   perform second weighting on the flat portion;
   deform, at a deformation unit, the edge image data according to a predetermined method;
   perform third weighting on the edge image data which has been deformed by the deformation unit;
   add, at a first adding unit, the edge portion which has been subjected to the first weighting and the flat portion;
   add, at a second adding unit, an output of the first adding unit and the edge image data which has been deformed by the deformation unit and subjected to the third weighting; and
   adding an output of the second adding unit and the image data inputted thereto from the distortion reduction unit.

4. The image processing apparatus according to claim 1, wherein the image data is image data inputted from the first input unit for right-eye or left-eye.

5. The image processing apparatus according to claim 4, wherein the processor is further configured to execute the instructions to:
   receive input of a plurality of pieces of first difference image data obtained by taking a difference between the image data for right-eye and the image data for left-eye;
   perform sharpening processing on each of the plurality of pieces of first difference image data;
   synthesizing in a unit of predetermined group the plurality of pieces of first difference image data which have been subjected to the sharpening processing into one intermediate image data;
   performing sharpening processing on each of a plurality of pieces of second difference image data generated by synthesizing processing; and
   synthesizing the plurality of pieces of intermediate image data for right-eye or left-eye which have been generated by synthesizing processing and the plurality of pieces of second difference image data which have been subjected to the sharpening processing, into the one intermediate image data.

6. The image processing apparatus according to claim 5, wherein the processor is further configured to execute the instructions to:
   receive, via a transmission path frame, image data containing the image data inputted from the first input unit for right-eye or left-eye which has been compressed at a first compression ratio and the first difference image data which has been compressed at a second compression ratio,
   wherein the input of the first image data for right-eye or left-eye which has been compressed at the first compression ratio, and the second input unit receives input of the first difference image data which has been compressed at the second compression ratio.

7. The image processing apparatus according to claim 6, wherein the first compression ratio is higher than the second compression ratio.

8. An image processing method executed by an image processing apparatus, the method comprising:
   receiving input of a plurality of pieces of first image data of successive plural frames;
   performing sharpening processing on each of the plurality of pieces of image data of the successive plural frames;
   performing super-resolution processing in a unit of predetermined group to the plurality of pieces of image data which have been subjected to the sharpening processing, and generating an intermediate image data;
   performing sharpening processing on each of a plurality of pieces of intermediate image data generated by super-resolution processing; and
   performing super-resolution processing in a unit of predetermined group to the plurality of pieces of intermediate image data which have been subjected to the sharpening processing, and generating the an intermediate image data.

9. A non-transitory computer readable storage media having instructions for:
   receiving input of a plurality of pieces of first image data of successive plural frames;
   performing sharpening processing on each of the plurality of pieces of image data of the successive plural frames;
   performing super-resolution processing in a unit of predetermined group to the plurality of pieces of image data which have been subjected to the sharpening processing, and generating an intermediate image data;

performing sharpening processing on each of a plurality of pieces of intermediate image data generated by super-resolution processing; and performing super-resolution processing in a unit of predetermined group to the plurality of pieces of second image data which have been subjected to the sharpening processing, and generating the intermediate image data.

* * * * *